(12) United States Patent
Liu et al.

(10) Patent No.: US 12,521,420 B2
(45) Date of Patent: Jan. 13, 2026

(54) RELAY DIRECTIONAL MOLECULAR COMMUNICATION METHOD BASED ON MULTIPLE ATTRACTANTS

(71) Applicant: Yangtze Delta Region Institute (Quzhou), University of Electronic Science and Technology of China, Quzhou (CN)

(72) Inventors: Qiang Liu, Quzhou (CN); Hao Du, Quzhou (CN); Kun Yang, Chengdu (CN); Yunkai Wei, Chengdu (CN)

(73) Assignee: Yangtze Delta Region Institute (Quzhou), University of Electronic Science and Technology of China, Quzhou (CN)

( * ) Notice: Subject to any disclaimer, the term of this patent is extended or adjusted under 35 U.S.C. 154(b) by 335 days.

(21) Appl. No.: 18/486,166

(22) Filed: Oct. 13, 2023

(65) Prior Publication Data

US 2024/0041947 A1 Feb. 8, 2024

Related U.S. Application Data

(63) Continuation of application No. PCT/CN2023/108406, filed on Jul. 20, 2023.

(30) Foreign Application Priority Data

Jul. 22, 2022 (CN) .......................... 202210865941.6

(51) Int. Cl.
*A61K 35/74* (2015.01)
*H04B 7/15* (2006.01)

(52) U.S. Cl.
CPC ............... *A61K 35/74* (2013.01); *H04B 7/15* (2013.01)

(58) Field of Classification Search
CPC ..................................................... A61K 35/74
See application file for complete search history.

(56) References Cited

FOREIGN PATENT DOCUMENTS

CN 111521172 * 8/2020

* cited by examiner

*Primary Examiner* — Albert M Navarro
(74) *Attorney, Agent, or Firm* — Zhigang Ma

(57) ABSTRACT

A relay directional molecular communication method based on multiple attractants is applied in a field of molecular communication to address the inefficiency of existing technologies. The method for relay nodes is used by fixing three types of attractants, and the relay nodes only release one of the three types of attractants. By using relative priority between two attractants, nanomachines can quickly find a target. Compared with existing multi-attractant multi-relay algorithms, the method does not require many types of attractant resources due to the three types of attractants, saves a variety of the attractant resources, and still achieves an effect greater than three hop relays. It is realized that when a number of the relay nodes is certain, not only the type of attractants used can be reduced, but also the efficiency of finding the target can be maintained.

5 Claims, 3 Drawing Sheets

RELAY DIRECTIONAL MOLECULAR COMMUNICATION METHOD BASED ON MULTIPLE ATTRACTANTS

TECHNICAL FIELD

The disclosure relates to the technical field of molecular communications, and more particularly to a relay directional molecular communication.

BACKGROUND

Molecular communication is an interdisciplinary subject of biology, chemistry and communication. Currently, the research on the molecular communication is still in its infancy. The directional molecular communication technology can be applied in targeted substance detection and intelligent drug delivery in biomedicine. However, there are few researches on a nanomachine directional communication control algorithm both domestically and internationally. At present, the directional communication control algorithm is mainly based on the chemotactic effect, and the algorithm based on chemotactic effect is mainly suitable for small-area and short-distance scenarios. The nanomachines have high targeting performance. However, due to the limited range of target action and the slow movement of particles under the chemotactic effect, the algorithm is not suitable for directional control over long distances, and most of the directional communication control algorithms based on the chemotactic effect, which have good performance, often use multiple attractants and relays, resulting in high system implementation complexity. At present, three main directional communication methods based on the chemotactic effect in molecular communication are as follows: multiple attractants with multiple relays, single attractant with single relay and non-relay. The characteristic of the multiple attractants with multiple relays is that the types of attractants released by each hop relay are different, and the closer the relay is to the target, the higher the priority of the released attractants for the nanomachines. With the assistance of the relay nodes, the nanomachines can quickly find the target with high efficiency. However, due to its particularity, there are many requirements for the type of attractant and the complexity is high. The characteristic of the single attractant with single relay is that all relay nodes in the method release the same attractant, but it is different from the attractant released by the target, and only one type of attractant is needed, which relatively reduces the efficiency of the nanomachine in finding the target. For the method that does not require the relay nodes, there is no need for attractants, and it is inefficient to rely on the nanomachine itself to randomly walk to find the target.

SUMMARY

To solve the above technical problems, a relay directional molecular communication method based on multiple attractants is provided. Based on a relative priority among a target attractant and three types of attractants, compared with the multi-attractant multi-relay method, the method of the disclosure can effectively save the types of attractants when the number of hops is high, and it can ensure that the efficiency of the nanomachines in finding a target remains roughly unchanged when the number of relay nodes is certain. Compared to the relay-free node algorithm and the single attractant single relay algorithm, the method of the disclosure can significantly improve the efficiency of finding the target.

The technical solutions are as follows. Specifically, a relay directional molecular communication method based on multiple attractants is provided, a communication system includes: nanomachines, a target, relay nodes and attractants. The specific types of attractants include attractants A, B1, B2 and B3. A target attractant released by the target is the attractant A, and each of the relay nodes releases one of the attractants B1, B2, and B3. The relay directional molecular communication method includes the following steps.

Step 1, positions of the nanomachines and positions of the relay nodes are initialized firstly, while the relay nodes and the nanomachines are allowed to move randomly. Once the relay nodes and the nanomachines begin to move, the relay nodes and the nanomachines periodically detect a presence of a detectable attractant around themselves until the relay nodes and the nanomachines stop moving.

Step 2, when the relay nodes detect the attractant A, the relay nodes stop moving and release the attractant B1, otherwise, when the relay nodes only detect the attractant B1, the relay nodes stop moving and release the attractant B2. When the relay nodes only detect the attractant B2, the relay nodes stop moving and release the attractant B3. When the relay nodes only detect the attractant B3, the relay nodes stop moving and release the attractant B1. When the relay nodes detect both the attractant B1 and the attractant B2, the relay nodes stop moving and release the attractant B1. When the relay nodes detect both the attractant B2 and the attractant B3, the relay nodes stop moving and release the attractant B2. When the relay nodes detect both the attractant B1 and the attractant B3, the relay nodes stop moving and release the attractant B3. The relay nodes cannot detect the attractant B1, the attractant B2 and the attractant B3 simultaneously, because when encountering the three types of attractants, the relay nodes can pass through a certain attractant, and when passing through the attractant, one of the above situations can occur, then the relay nodes stop moving and release the corresponding attractant. If no attractant is detected, the relay nodes continue to walk randomly.

Step 3, When the nanomachines detect the attractant A, the nanomachines move towards a direction with a high concentration of the attractant A, otherwise, when the nanomachines detect the one of the attractant B1, the attractant B2 and the attractant B3, the nanomachines move towards the direction with the high concentration of the corresponding attractant. When the nanomachines detect both the attractant B1 and the attractant B2, the nanomachines move towards the direction with the high concentration of the attractant B1. When the nanomachines detect both the attractant B2 and the attractant B3, the nanomachines move towards the direction with the high concentration of the attractant B2. When the nanomachines detect both the attractant B1 and the attractant B3, the nanomachines move towards the direction with the high concentration of the attractant B3. When the nanomachines simultaneously detect the attractant B1, the attractant B2 and the attractant B3, the nanomachines move randomly. Finally, if the nanomachines do not detect any attractant, they will walk a random cycle.

Step 4, it is necessary to determine whether 90% of the nanomachines have reached the target area. When 90% of the nanomachines have already reached, then a directional communication process based on chemotaxis ends. Otherwise, the nanomachines that have not yet reached the target area continue to cycle through step S3 to find the target until at least 90% of the nanomachines have reached the target area.

The benefits of the method are as follows. In existing single attractant single relay algorithms, all relays release the same attractant, meaning that all relays are the same hop node. The method can achieve more than three hop relay nodes by fixing three types of attractants and using relative priority between two attractants. However, the relay nodes only release one of the three types of attractants. When encountering multiple attractants, the nanomachines can quickly approach the target through the relative priority between the attractants.

Compared with the existing multi-attractant multi-relay algorithm, the method of the disclosure does not require many types of attractant resources due to the fixation of three types of attractants, which saves the variety of attractant resources, and can still achieve the effect of greater than three-hop relay. When the number of relay nodes is certain, not only can the use of attractants be reduced, but also the efficiency of finding targets can be maintained.

DETAILED DESCRIPTION OF EMBODIMENTS

In order to facilitate those skilled in the related art to understand the technical content of the disclosure, the following will further explain the content of the disclosure in conjunction with the following drawings.

A new multi-hop relay directional communication algorithm based on chemotaxis in the molecular communication, the working principle is as follows. In a process of searching for a target by nanomachines, the nanomachines need to determine whether the target or an attractant released by relay nodes is detected. The method requires the nanomachines to determine whether a concentration of the attractant released by the target or the relay nodes reaches a threshold at which the nanomachines are able to detect the attractant, which is 0.001 per cubic micrometers ($/\mu m^3$), and if the concentration of the attractant reaches above the threshold, indicating that the attractant is detected, otherwise indicating that the attractant is not detected.

The nanomachines can be modified from certain bacteria, such as *Escherichia coli*, the bacteria can perceive attractant molecules through their own characteristics, but the concentration of the attractant molecules needs to reach the threshold. The target can be a diseased tissue in a human body, such as tumor cells, the relay nodes are also modified by the bacteria, but their function is to help the nanomachines find the target. Releasing attractants is also a bacterial characteristic, and the attractant in the disclosure is essentially a chemical molecule released by the bacteria.

Figure 3:
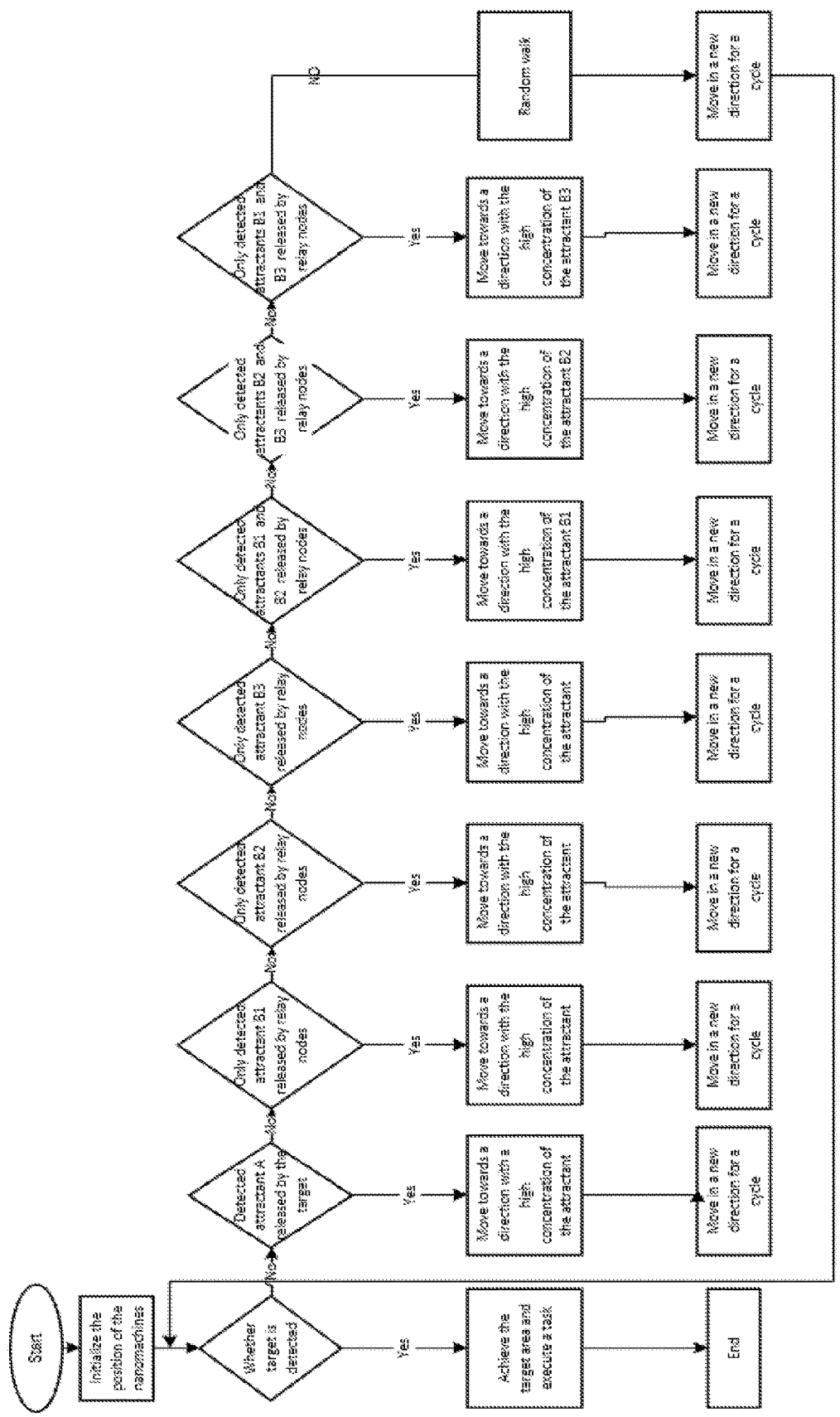
FIG. 3 is a nanoscale mobile strategy proposed in the disclosure.

As shown in FIG. 3, a specific implementation process of the nanomachines detecting the attractants is as follows. When the nanomachines detect an attractant A, the nanomachines move towards a direction with a high concentration of the attractant A, otherwise, when the nanomachines detect the one of an attractant B1, an attractant B2 and an attractant B3, the nanomachines move towards a direction with a high concentration of the corresponding attractant. When the nanomachines detect both the attractant B1 and the attractant B2, the nanomachines move towards the direction with the high concentration of the attractant B1. When the nanomachines detect both the attractant B2 and the attractant B3, the nanomachines move towards the direction with the high concentration of the attractant B2. When the nanomachines detect both the attractant B1 and the attractant B3, the nanomachines move towards the direction with the high concentration of the attractant B3. When the nanomachines simultaneously detect the attractant B1, the attractant B2 and the attractant B3, the nanomachines move randomly. Because encountering three types attractants simultaneously may cause the nanomachines to move away from the target, similarly, it is true for every nanomachine, circulating until 90% of the nanomachines find the target and stop the cycle.

Figure 4:
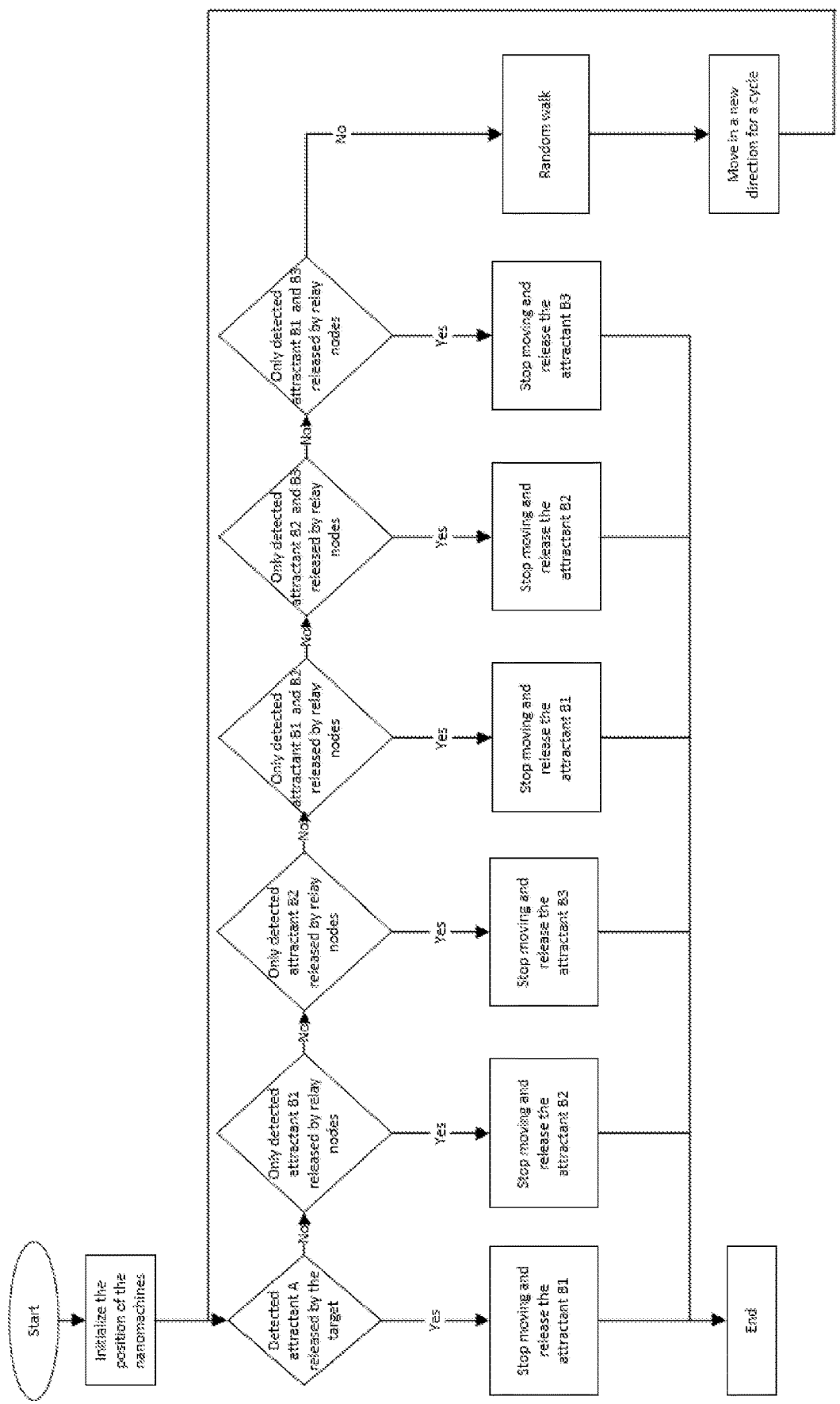
FIG. 4 is a relay mobile strategy proposed in the disclosure.

For all the relay nodes and the target, an interval cycle for releasing the attractants is 1 second, and it is assumed that the attractants released between each cycle do not interfere with each other. The target releases the attractant A, and all the relay nodes can only release the one of the three types of the attractants B1, B2, and B3. The relay nodes determine what type of the attractant it should release by detecting the type of attractant, as shown in FIG. 4 and a specific implementation process is as follows. When the relay nodes detect the attractant A, the relay nodes stop moving and release the attractant B1, otherwise, when the relay node only detect the attractant B1, the relay nodes stop moving and release the attractant B2. When the relay nodes only detect the attractant B2, the relay nodes stop moving and release the attractant B3. When the relay nodes only detect the attractant B3, the relay nodes stop moving and release the attractant B1. When the relay nodes detect both the attractant B1 and the attractant B2, the relay nodes stop moving and release the attractant B1. When the relay nodes detect both the attractant B2 and the attractant B3, the relay nodes stop moving and release the attractant B2. When the relay nodes detect both the attractant B1 and the attractant B3, the relay nodes stop moving and release the attractant B3. The relay nodes cannot detect the attractants B1, B2, and B3 simultaneously, because when encountering the three types of the attractants, the relay nodes can pass through a certain attractant, and when passing through the attractant, one of the above situations can occur, then the relay nodes will stop moving and release the corresponding attractant. If the relay nodes never detect any attractants, then the relay nodes will continue to randomly walk and repeat the above process.

When performing specific operations, the process is shown in FIGS. 3 and 4. The specific operation method of the new multi-hop relay directional communication algorithm based on chemotaxis in the molecular communication includes the following steps.

Step 1, positions of the nanomachines and positions of the relay nodes are initialized firstly, while the relay nodes and the nanomachines are allowed to move randomly. Once the relay nodes and the nanomachines begin to move, the relay nodes and the nanomachines periodically detect a presence of a detectable attractant around themselves until the relay nodes and the nanomachines stop moving.

Step 2, for the relay nodes, it is necessary to detect whether a certain attractant or multiple attractants are detected herein, and then decide to release a certain attractant and stop moving or continue random walking. A specific implementation process is as follows. When the relay nodes detect the attractant A, the relay nodes stop moving and release the attractant B1, otherwise, when the relay nodes only detect the attractant B1, the relay nodes stop moving and release the attractant B2. When the relay nodes only detect the attractant B2, the relay nodes stop moving and release the attractant B3. When the relay nodes only detect the attractant B3, the relay nodes stop moving and release the attractant B1. When the relay nodes detect both the attractant B1 and the attractant B2, the relay nodes stop moving and release the attractant B1. When the relay nodes detect both the attractant B2 and the attractant B3, the relay nodes stop moving and release the attractant B2. When the relay nodes detect both the attractant B1 and the attractant B3, the relay nodes stop moving and release the attractant B3. The relay nodes cannot detect the attractant B1, the attractant B2 and the attractant B3 simultaneously, because when encountering the three types of attractants, the relay nodes can pass through a certain attractant, and when passing through the attractant, one of the above situations can occur, then the relay nodes stop moving and release the corresponding attractant. If no attractant is detected, the relay nodes continue to walk randomly.

Step 3, for the nanomachines, the detection of the target by the nanomachines refers to a fact that the nanomachines are already located in a circular area with a radius of r centered on the target (r is a constant). When the target is detected, the nanomachines reach the target area to execute a task, otherwise, the nanomachines will judge whether the attractant released by the target is detected. When the attractant released by the target is detected, the nanomachines can move towards a place with a high concentration of the attractant, otherwise, the nanomachines will judge whether the attractant released by the relay nodes is detected, when the attractant released by the relay nodes is detected, a certain strategy can be adopted to approach the target. A specific implementation process is as follows. When the nanomachines detect the attractant A, the nanomachines move towards a direction with a high concentration of the attractant A, otherwise, when the nanomachines detect the one of the attractant B1, the attractant B2 and the attractant B3, the nanomachines move towards the direction with the high concentration of the corresponding attractant. When the nanomachines detect both the attractant B1 and the attractant B2, the nanomachines move towards the direction with the high concentration of the attractant B1. When the nanomachines detect both the attractant B2 and the attractant B3, the nanomachines move towards the direction with the high concentration of the attractant B2. When the nanomachines detect both the attractant B1 and the attractant B3, the nanomachines move towards the direction with the high concentration of the attractant B3. When the nanomachines simultaneously detect the attractant B1, the attractant B2 and the attractant B3, the nanomachines move randomly. Finally, if the nanomachines do not detect any attractant, they will walk a random cycle.

Step 4, it is necessary to determine whether 90% of the nanomachines have reached the target area. When 90% of the nanomachines have already reached, then a directional communication process based on chemotaxis ends. Otherwise, the nanomachines that have not yet reached the target area continue to cycle through step S3 to find the target until at least 90% of the nanomachines have reached the target area.

It should be noted that, the method is applied to detect tumor cells or cancer signs and then carry out drug delivery. The nanomachines detect the substance (e.g., the target attractant A) released by tumor cells to find a lesion site of the tumor cells (i.e., the target), and then the nanomachines deliver medicines according to the lesion site of the tumor cells to thereby achieve a targeted therapy. Under normal circumstances, the nanomachines are far away from the tumor cells, the nanomachines detected the target attractant A can release the target attractant B to attract the nanomachines far away from the tumor cells by using the relay directional molecular communication.

Figure 1:
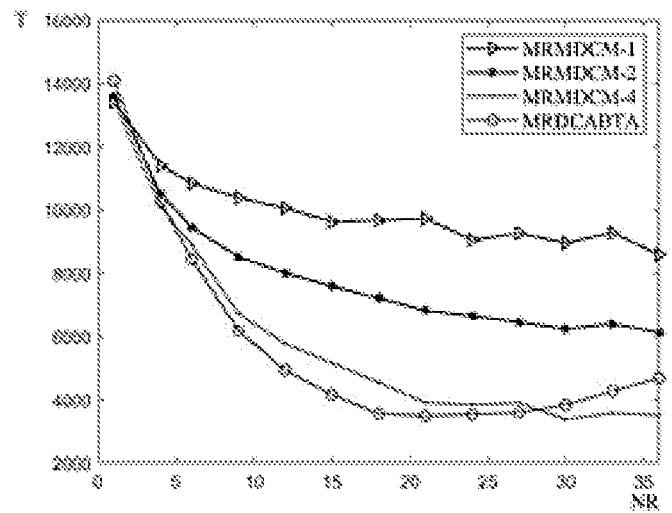
FIG. 1 is a schematic diagram of a relay directional molecular communication method based on multiple attractants compared with other relay algorithms.
Figure 2:
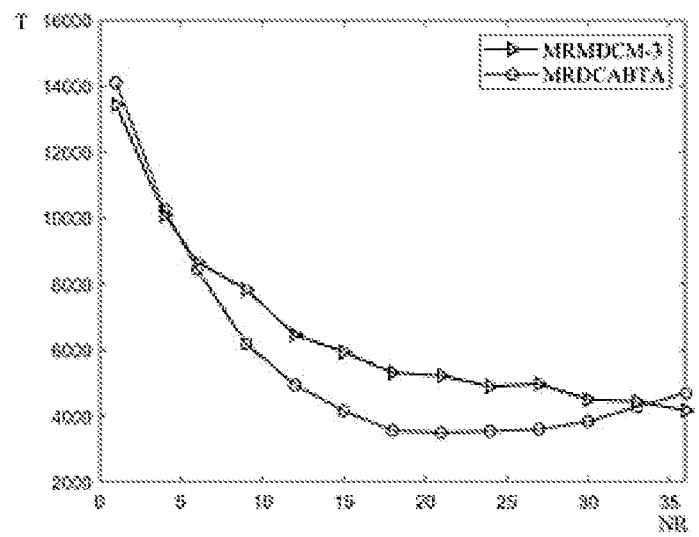
FIG. 2 is a schematic diagram of the relay directional molecular communication method based on multiple attractants of the disclosure compared with a previous relay algorithm using three same types of attractants as the method of the disclosure.

The algorithm of the disclosure is compared with other existing algorithms, as shown in FIGS. 1 and 2, it can be found that the efficiency of the algorithm of the disclosure is greatly improved compared with the algorithm using less than the three types of attractants. Compared with the use of the same type of attractant, the overall efficiency is better. Compared with the algorithm using more than the three types of attractants, the efficiency of the algorithm of the disclosure is unchanged or even better when the relay nodes are certain. When a number of the relay nodes increases, an intersection of the three types of attractants becomes more, which have a certain impact on the efficiency. MRMDCM-1 is a one-hop relay algorithm using an attractant, MRMDCM-2 is a two-hop relay algorithm using two different attractants, MRMDCM-3 is a three-hop relay algorithm using three different attractants and MRMDCM-4 is a four-hop relay algorithm using four different attractants.

Those skilled in the related art can realize that the embodiment described herein is intended to help readers understand the principles of the disclosure, and should be understood that the scope of protection of the disclosure is not limited to such special description and the embodiment. For those skilled in the related art, the disclosure can undergo various modifications and variations. Any modifications, equivalent substitutions, improvements, etc. made within the spirit and principles of the disclosure shall be included within the scope of the claims of the disclosure.

What is claimed is:

1. A relay directional molecular communication method based on multiple attractants wherein an application scene comprises nanomachines, relay nodes and a target; and the method comprises:

making all the relay nodes move randomly in an initial state and then periodically detecting whether there is a certain attractant by the relay nodes; wherein when a target attractant released by the target is detected, the relay nodes stop moving and release an attractant corresponding to the relay nodes; when one or more attractants released by the relay nodes are detected, then the relay nodes stop moving and release another attractant corresponding to the relay nodes; when no attractant is detected, the relay nodes randomly walk a cycle;

making all the nanomachines move randomly and then periodically detecting the target by the nanomachines; wherein when the target is detected by the nanomachines, the nanomachines reach an area of the target to execute a task; when the target is not detected by the nanomachines, the nanomachines determines whether the target attractant released by the target is detected; when the target attractant released by the target is detected, the nanomachines move in a direction from a low concentration to a high concentration of the target attractant; when the target attractant released by the target is not detected, the nanomachines determine whether the one or more attractants released by the relay nodes are detected, when the nanomachines detect the one or more attractants released by the relay nodes, the nanomachines select one of the relay nodes based on a relative priority between the attractants released by the relay nodes and move towards the one of the relay nodes; when any attractant released by the relay nodes is not detected, the nanomachines randomly walk a cycle;

targeting the target after the nanomachines reach the area of the target and the nanomachines stop the periodically detecting, and treating a disease in the target by executing the task with the nanomachines;

wherein the nanomachines detect the target attractant released by the target to find a lesion site of tumor cells, and then the nanomachines deliver medicines according to the lesion site of the tumor cells to thereby achieve a targeted therapy.

2. The method as claimed in claim 1, wherein the target attractant is an attractant A, the one or more attractants comprise an attractant B1, an attractant B2 and an attractant B3, and each of the relay nodes releases one of the attractant B1, the attractant B2 and the attractant B3.

3. The method as claimed in claim 2, wherein the relay nodes are configured to release a specific type of attractant of the one or more attractants determined by detecting a type of the attractants; and the method comprises:

when the relay nodes do not detect any attractant, then making the relay nodes continue to move randomly;

when the relay nodes detect the attractant A, making the relay nodes stop moving and release the attractant B1;

when the relay nodes only detect the attractant B1, making the relay nodes stop moving and release the attractant B2;

when the relay nodes only detect the attractant B2, making the relay nodes stop moving and release the attractant B3;

when the relay nodes only detect the attractant B3, making the relay nodes stop moving and release the attractant B1;

when the relay nodes detect both the attractant B1 and the attractant B2 simultaneously, making the relay nodes stop moving and release the attractant B1;

when the relay nodes detect both the attractant B2 and the attractant B3 simultaneously, making the relay nodes stop moving and release the attractant B2;

when the relay nodes detect both the attractant B1 and the attractant B3 simultaneously, making the relay nodes stop moving and release the attractant B3.

4. The method as claimed in claim 3, comprising:

when nanomachines reach the target, determining whether a cumulative number of the nanomachines reaching the target is greater than or equal to 90% of a total number of nanomachines, ending a molecular communication process when the cumulative number is one of greater than and equal to 90% of a total number of the nanomachines;

making remaining nanomachines continue to search for the target when the cumulative number is less than 90% of the total number of the nanomachines.

5. The method as claimed in claim 4, wherein the nanomachines select one of the relay nodes based on the relative priority between the attractants released by the relay nodes and move towards the one of the relay nodes, comprising:

when the nanomachines detect the attractant A, making the nanomachines move towards the direction from the low concentration to the high concentration of the attractant A;

when the nanomachines only detect one of the attractant B1, the attractant B2 and the attractant B3, making the nanomachines move towards a direction from a low concentration to a high concentration of the one of the attractant B1, the attractant B2 and the attractant B3;

when the nanomachines detect both the attractant B1 and the attractant B2, making the nanomachines move towards a direction from a low concentration to a high concentration of the attractant B1;

when the nanomachines detect both the attractant B2 and the attractant B3, making the nanomachines move towards a direction from a low concentration to a high concentration of the attractant B2;

when the nanomachines detect both the attractant B1 and the attractant B3, making the nanomachines move towards a direction from a low concentration to a high concentration of the attractant B3;

when the nanomachines simultaneously detect the attractant B1, the attractant B2 and the attractant B3, making the nanomachines move randomly.

* * * * *